United States Patent [19]

Rejeski

[11] 4,023,589

[45] May 17, 1977

[54] TUBULAR JOINT AND THE PRODUCT FORMED THEREBY

[75] Inventor: William E. Rejeski, Farmington, Conn.

[73] Assignee: The Wiremold Company, West Hartford, Conn.

[22] Filed: Oct. 15, 1974

[21] Appl. No.: 515,055

[52] U.S. Cl. ............................... 138/149; 138/156; 138/170; 156/203; 156/218; 220/75

[51] Int. Cl.$^2$ ......................................... F16L 9/14

[58] Field of Search .......... 138/128, 149, 151, 152, 138/156, 170, 167, 164; 156/203; 220/75, 80; 113/1 M, 116 QA

[56] References Cited

UNITED STATES PATENTS

| | | | |
|---|---|---|---|
| 652,975 | 7/1900 | Newbury | 138/128 X |
| 1,907,307 | 5/1933 | Smith | 138/149 |
| 2,302,563 | 11/1942 | Masters | 220/75 X |
| 2,380,427 | 7/1945 | Gilfillan | 138/170 |
| 2,394,818 | 2/1946 | Stodtfeld | 138/170 |
| 2,625,263 | 1/1953 | Kice et al. | 138/170 X |
| 2,801,648 | 8/1957 | Anderson et al. | 138/170 |
| 2,990,309 | 6/1961 | Wahl et al. | 138/170 X |
| 3,066,063 | 11/1962 | Ecklund et al. | 156/203 |
| 3,070,274 | 12/1962 | Elam | 138/167 |
| 3,763,895 | 10/1973 | Okubo et al. | 138/170 |
| 3,877,491 | 4/1975 | Thastrup | 138/149 |

*Primary Examiner*—Richard E. Aegerter
*Assistant Examiner*—James E. Bryant, III
*Attorney, Agent, or Firm*—Prutzman, Hayes, Kalb & Chilton

[57] ABSTRACT

A method is described for joining the opposite edge portions of a sheet of flexible material to form a durably-joined elongated tubular member. The material is shaped or folded to provide opposite edge flaps, spaced and extending outwardly from the tubular member formed. A strip of connector tape, folded lengthwise to form a pair of leg flaps, is interposed between the edge flaps with its legs confronting and extending oppositely thereto. Each leg flap is bonded to its corresponding adjacent edge flaps, whereby the tape serves to connect the edge flaps and form a longitudinal joint within the elongated tubular member. The tubular member so produced may include an insulating layer and a flexible skeletal structure therewithin.

3 Claims, 3 Drawing Figures

U.S. Patent   May 17, 1977   4,023,589
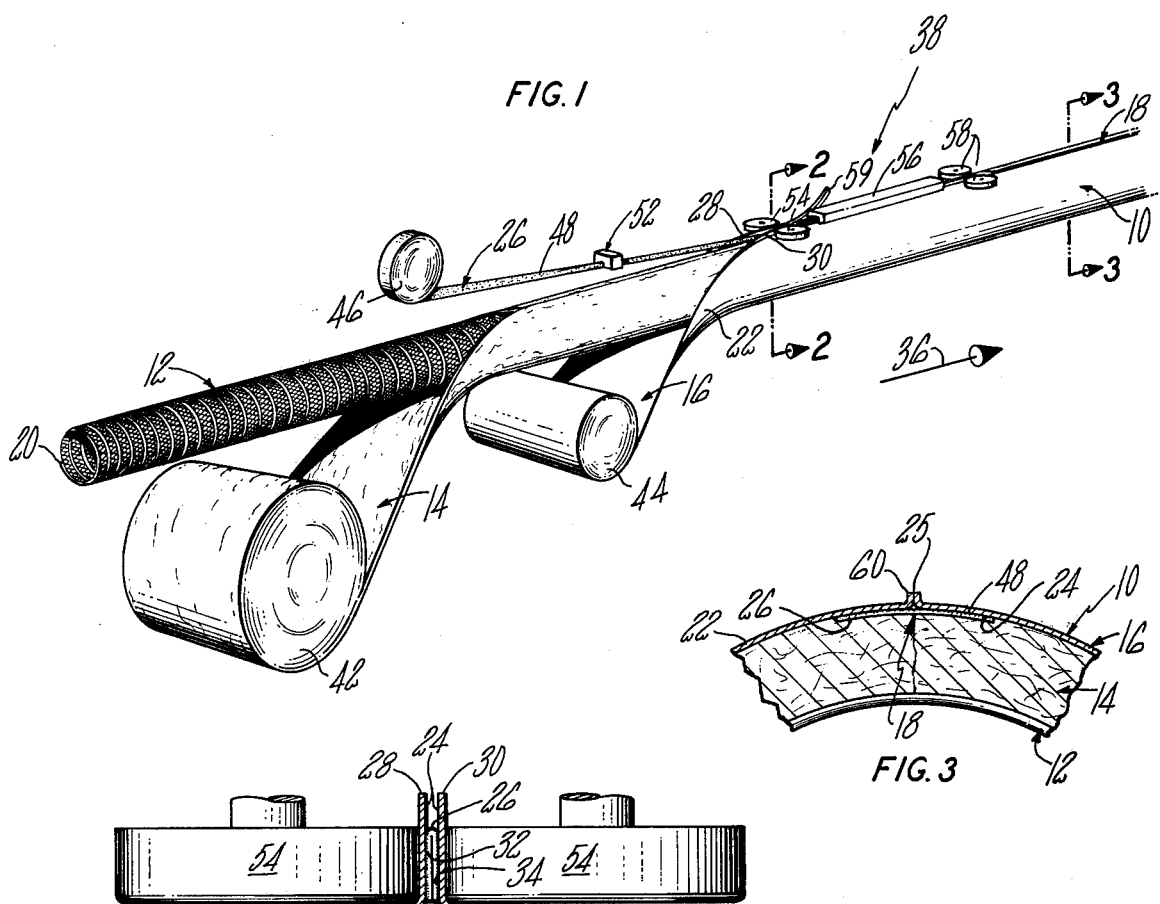
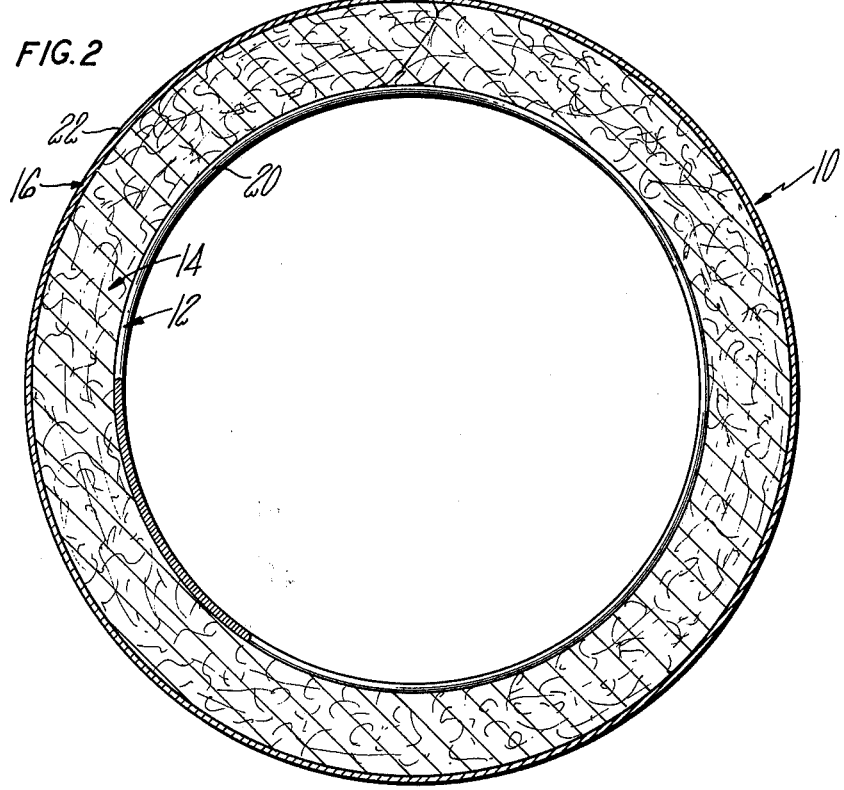

TUBULAR JOINT AND THE PRODUCT FORMED THEREBY

BACKGROUND OF THE INVENTION

The invention relates to tubular members and more specifically to elongated flexible tubular ducts of a flexible material and to the longitudinal joint herein and to the method of making such jointed ducts.

Tubular members, and more specifically flexible tubular ducts, serve a variety of needs. For example, they may be required to convey gases, without substantial leakage, at a pressure other than ambient. There may additionally be thermal considerations requiring insulation, as in air conditioning ducts. Still further, the ducts may be required to possess some degree of flexibility to facilitate installation.

It is an object of the invention to provide a elongated tubular member which is formed of a flexible material and which includes a durable and tight joint. Still another object of the invention is the provision of a substantially flat joint or seal on the inside surface of the tubular casing of an elongated tubular duct having an insulating liner and skeletal member therewithin.

It is a further object of the invention to provide a method of making a longitudinal joint or seal in an elongated tubular member. A still further object is the provision of a method of forming a longitudinal joint in a substantially continuous tubular member of flexible material, which method is readily suited to automation. Further, it is an object to provide a method of making a tubular duct having an inner, annular support member and insulating portion and an outer longitudinally jointed, casing embracing the insulating portion.

SUMMARY OF THE INVENTION

According to the invention, there is provided a method for making a seal or joint in a tubular member and a tubular member incorporating such joint. The improved joint is particularly strong and durable, maintaining the integrity of the tubular member under a variety of stress and moisture conditions. Further, the joint is formed in a manner suited to continuous automated manufacture. The joint and its method of formation are particularly applicable to flexible insulated ducts and their manufacture.

In a preferred embodiment of the invention, an elongated tubular member, such as the casing or vapor barrier of an insulated duct, is formed by shaping or folding a sheet of flexible material to place a pair of opposite edge flaps thereof in spaced, outwardly extending orientation, interposing a strip of connector tape between the spaced edge flaps, the tape being shaped and positioned to have a pair of leg flaps extending oppositely of and confronting the edge flaps; and bonding each edge flap to the corresponding adjacent leg flaps, whereby said tape connectively joins the opposite edge flaps of the sheet. The connector tape may be heat sealable with the inside faces of the edge flaps.

The invention may be practiced to form a tubular member having a durable inside joint, and further, to provide a longitudinally joined or sealed vapor barrier for a flexible, insulated duct.

BRIEF DESCRIPTION OF THE DRAWINGS

In the drawings:

FIG. 1 is a perspective view of a diagrammatic arrangement for practicing the method of producing the product according to the invention;

FIG. 2 is a sectional view taken on line 2—2 of FIG. 1 showing the tubular joint during its formation as part of an insulated duct; and FIG. 3 is a sectional view taken on line 3—3 of FIG. 1 showing the completed duct and joint.

DETAILED DESCRIPTION OF THE DRAWINGS

A tubular member incorporating the features of the invention may be exhibited in a simple elongated tubular element formed of a flexible material; however, it is further illustrated and embodied in an elongated, flexible, insulated tubular duct having a vapor barrier, as for use in air conditioning. It is this latter embodiment which is described hereinafter. As used herein, the word "elongated" denotes a length greater than the width.

Referring to the drawings, the invention is described with reference to the method of making the product. An elongated duct 10 of indefinite length may comprise a central core 12, a layer of insulation 14 disposed therearound and an outer casting or vapor barrier 16 closely embracing the insulation and sealed by joint 18.

The core 12 provides the skeletal support for duct 10 and comprises a helical coil 20 which may be covered by a fabric, as shown.

If the duct 10 is to be flexible, as in the present embodiment, insulation 14 will be a resilient material such as fiber glass or mineral wool or the like.

Vapor barrier 16 is formed by a sheet of flexible material 22 which may include a heat sealable coating 24 on a portion of one surface thereof. Material 22 may be a thin, tough sheet of polyester film or similar plastic, or paper or the like which is substantially imperforate to serve as a barrier to vapor attempting to pass through it. Heat sealable coating 24 may be of uncured neoprene, polyvinyl chloride or other material known in the art.

Joint 18 in vapor barrier 16 is formed in a novel manner by affixing a strip of flexible connector tape 26 to the pair of edge flaps 28 and 30 of sheet 22 to connectively join the opposite edges of the sheet in an edge-abutting relationship which defines seam 25. The sheet 22 of flexible material is folded or formed such that edge flaps 28 and 30 extend outward near one another in substantially parallel and coextensive spaced relationship. Tape 26 is folded or shaped to provide a pair of leg flaps 32 and 34. Tape 26 is positioned between edge flaps 28 and 30 with leg flaps 32 and 34 confronting and extending oppositely thereto. Edge flaps 28 and 30 are moved into contact with leg flaps 32 and 34 respectively and are bonded thereto, as by heat seal bonding. This results in the joint 18 seen in FIG. 3.

A more detailed description of the duct 10 and joint 18 and their formation follows, with reference to FIG. 1. Duct 10 is advanced in the direction of arrow 36, relative to manufacturing station 38 with core 12 centrally positioned for said advancement in a known manner.

Insulation material 14 is generally in the form of a thick resilient mat or sheet of fiber glass stored on and dispensed from roll 42. Insulation 14 is wrapped or folded around core 12, as it moves thereby, by means of guide rollers or shaping dies of a type known in the art and not shown here for the sake of brevity and clarity. Insulation 14 is sized to completely encircle core 12 with possibly some small overlap or bunching.

Vapor barrier material 22 is stored on and dispensed from roll 44. Material 22 is thin and flexible and has a width which is somewhat greater than the circumference of the wrapped insulation 14.

Material 22 is applied over insulation 14 and, like insulation 14, is folded about the insulation through the use of guide rollers or shaping dies, or the like. An example of such shaping dies may be seen in U.S. Ser. No. 521,657 of William E. Rejeski and Norman J. Perusse dated Nov. 7, 1974 and entitled "Machine for Manufacturing Insulated Duct." In folding material 22 about insulation 14, edge flaps 28 and 30 at the opposite edges of the sheet of material are guided such that they run generally longitudinally and extend outwardly from the resulting tubular member in spaced and substantially parallel and coextensive relationship. Edge flaps 28 and 30 may each be an inch or more in length. The material 22 is applied to insulation 14 such that the heat sealable coating 24, which is normally on the edge flaps 28 and 30, is on the inner or facing surfaces of the edge flaps.

Tape 26 is stored on and dispensed from roll 46. Tape 26 may typically have a width of an inch or more and is a strong, flat, relatively thin material, such as woven fiber glass. One side of tape 26 includes a heat sealable coating 48 thereon. While both the material 22 and tape 26 are described as having heat sealable coatings, it will be appreciated that it need only appear on one of them. Coating 48 may be of essentially the same composition as coating 24 on material 22. A flat strip of tape 26 is folded longitudinally or lengthwise at or near its center line at folding or shaping station 52 thereby creating the two leg flaps 32 and 34. In crosssection, folded tape 26 will appear as a V, in this instance inverted. Heat sealable coating 48 is on the outside of the folded tape 26.

The folded tape 26 then passes to a position between the closely spaced and outwardly extending edge flaps 28 and 30 of material 22, with the leg flaps 32 and 34 extending inwardly toward insulation 14 and core 12 from the apex of the folded tape. The folded tape 26 is positioned inwardly between edge flaps 28 and 30 such that the inner ends of leg flaps 32 and 34 are near the inner or base ends of edge flaps 28 and 30 proximate the O.D. of the layer of insulation 14. The width of tape 26 is preferably such that its apex will be radially inward of the outer ends of edge flaps 28 and 30 to place leg flaps 32 and 34 in confronting relationship with edge flaps 28 and 30.

The above positioning of the tape 26 relative to edge flaps 28 and 30 is accomplished with guide rollers or other techniques known in the art. This occurs immediately upstream of a pair of closely spaced cutting rollers 54. The leg flaps 28 and 30 and the folded tape 26 now positioned therebetween are passed between cutting rollers 54, which aid in merging the several flaps into close lateral contact with one another, as seen in FIG. 2, and which cut or sever the excess strip 59 of material 22 caused by the edge flaps 28 and 30 extending outward beyond tape 26. The cut is made slightly above, or outward, of the tape 26 in order to ensure that the tape is not severed and further to allow the edges of vapor barrier material 22 to contact one another along seam 25 when the joint 18 is expanded, as in FIG. 3. This ensures that the tape 26 is not exposed to external abuse, and in fact, a short, outwardly extending stub 60 of flaps 28 and 30 may be permitted to remain, as seen in FIG. 3.

Immediately downstream of rollers 54, there is positioned a heat sealer 56 of a type known in the art, one example being that described in U.S. Pat. No. 2,679,473 for "Rotary Heat Sealer" issued Dec. 21, 1954 to Techtmann. The flaps 28, 30, 32 and 34, in lateral contact, pass through heat sealer 56 where an elevated temperature causes a melting of the heat seal coatings 24 and 48 on edge flaps 28 and 30 and on leg flaps 32 and 34 respectively. Continued lateral pressure inward on the several flaps within the sealer 56 results in a fusion bonding of leg flap 32 with edge flap 28 and leg flap 34 with edge flap 30. Such lateral pressure may be applied by pressure rollers 58.

When duct 10 passes beyond and is released by pressure rollers 58, the joint 18 in vapor barrier 16 will go from the "pinched" configuration of FIG. 2 to the normal "expanded" configuration of FIG. 3, this expansion being aided by a radial expansion of insulation 14 following its earlier temporary compression prior to the positioning of the flaps 28, 30, 32 and 34 and the bonding. Other than any short stub 60, the duct 10 is essentially smooth or flat along seam 25, both internally and externally.

The prior compression of the insulation 14 is necessary in order for vapor barrier 16 to embrace the insulation in the completed duct 10, this because of the diametrical expansion of the vapor barrier from the "pinched" configuration of FIG. 2 to the "expanded" configuration of FIG. 3.

The extent of this expansion is determined by the width of tape 26, and thus the length of leg flaps 32 and 34, and by the positioning of the tape along edge flaps 28 and 30 while they are in the "pinched" configuration. Thus, for a particular width of tape 26, the inner ends of leg flaps 32 and 34 should be positioned adjacent the inner ends of edge flaps 28 and 32, which location in turn is established by compressing the insulation sufficiently to accommodate the expansion occasioned by the width of the tape alone.

The temporary compression of insulation 14 may be accomplished by imposing and maintaining compressive forces on it by the mechanical forming and guiding means employed to fold it about core 12 and/or by tensioning vapor barrier material 22 about the insulation until completion of the bonding operation.

While a preferred embodiment of the invention has been shown and described, various modifications and substitutions may be made thereto without departing from the spirit and scope of the present invention. Accordingly, it is to be understood that the present invention has been described by way of illustration and not limitation.

I claim:

1. An elongated flexible tubular member of indeterminate length comprising a flexible sheet of material curved to close on itself to provide a tubular member with opposite edges having longitudinally extending radially outwardly projecting interior surfaces in adjacent relation, an elongated tape folded lengthwise to provide a fold having a bend directed away from the center of the tubular member and free edges directed toward its center, the tape having exterior surfaces respectively confronting said interior surfaces of the tubular member, and means to adhere said interior surfaces of the tubular member with confronting exterior surfaces of the tape to form a tubualr member having a taped joint without the interior surfaces of the tape adhering to itself such that when tension is applied across the taped joint the tape will unfold and lie substantially flat inside the tubular member with its opposite edges overlapping the tape.

2. The tubular member of claim 1 wherein the tape comprises a continuous strip of flexible woven fiber glass.

3. The tubular member of clim 1 further including a resilient tubular inner content of diametrically compressible and expandable material, the tubular inner content being received within and releasably compressed by the flexible curved sheet during affixation of the tape to the sheet and expanded upon release to tension said taped joint.

* * * * *